(12) United States Patent
Sugata

(10) Patent No.: US 6,500,016 B2
(45) Date of Patent: Dec. 31, 2002

(54) CABLE REEL STRUCTURE AND METHOD OF ASSEMBLY

(75) Inventor: Shoichi Sugata, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/855,705

(22) Filed: May 16, 2001

(65) Prior Publication Data

US 2002/0022380 A1 Feb. 21, 2002

(30) Foreign Application Priority Data

May 17, 2000 (JP) ........................................ 2000-144430

(51) Int. Cl.$^7$ .............................................. H01R 35/04
(52) U.S. Cl. ....................................................... 439/164
(58) Field of Search ................................... 439/164, 15

(56) References Cited

U.S. PATENT DOCUMENTS

| | | |
|---|---|---|
| 5,429,517 A | 7/1995 | Bolen |
| 5,775,920 A | 7/1998 | Henderson |
| 6,059,591 A | 5/2000 | Bolen et al. |
| 6,099,331 A * | 8/2000 | Kikkawa et al. ............ 439/164 |
| 6,109,942 A * | 8/2000 | Bannai ........................ 439/164 |

FOREIGN PATENT DOCUMENTS

| | | |
|---|---|---|
| EP | 0968883 | 1/2000 |
| EP | 0968886 | 1/2000 |
| EP | 0974493 | 1/2000 |

* cited by examiner

*Primary Examiner*—Gary Paumen
(74) *Attorney, Agent, or Firm*—Greenblum & Bernstein, P.L.C.

(57) ABSTRACT

A cable reel structure includes a mobile member including a top guard portion, from which extend at least two (first and second) connector units configured to receive outside circuits. Each of the connector units contains bus bars extending therethrough, such that the bus bars can be bonded to the outside circuits by a welding machine equipped with an anvil and a horn. The connector units are placed in staggered positions to each other, and with respect to a diametrical center line of the cable reel, such that, even after the mobile member has been mounted onto the fixed member, the welding of the bus bars to the outside circuits can be performed, successively in the first connector unit and the second connector unit, by rotating the mobile member after the welding has been performed in the first connector unit. Ultrasonic or resistance welding can thus be effected in those connector units more easily.

8 Claims, 6 Drawing Sheets

CABLE REEL STRUCTURE AND METHOD OF ASSEMBLY

BACKGROUND OF THE INVENTION

1. Field of the Invention

The present invention relates to a cable reel structure for mounting into a vehicle steering system e.g. for automobiles. The cable reel structure includes a fixed member and a mobile member (rotor part) mounted thereon in a freely rotatable manner. More particularly, the invention concerns a plurality of connector units mounted on the mobile member. In such connector units, connections can easily be established between electrical cables (external circuits) and bus bars (internal circuits).

2. Description of Background Information

A steering wheel of a vehicle generally contains an airbag and an inflator for inflating the airbag. In such a construction, the cable reel, i.e. rotary connector, serves as a means for connecting the inflator to the vehicle's body side circuit. As shown in FIG. 1, the cable reel 1 includes a fixed member 2 that defines an external cylindrical portion and a bottom guard portion, and a mobile member 5 that defines an internal cylindrical portion and a top guard portion, the two members together forming a torus-shaped enclosure having a hollow inner space. As mentioned above, the mobile member 5 is mounted with the fixed member 2 in a freely rotatable manner. The fixed member 2 is then fixed with a combination switch body 3, which is in turn fixed to a steering column 4. Conversely, the mobile member 5 is fitted with a steering wheel. The torus-shaped enclosure contains a flat cable 6 in a spiraled condition. One end portion of the flat cable 6 is attached to the fixed member 2, while the other end portion is attached to the mobile member 5, so that the latter is connected to an external electrical cable. When the steering wheel is turned in a clockwise or counter-clockwise manner, the flat cable 6 is wound or unwound in conjunction with corresponding rotations of the mobile member 6.

The mobile member 5 includes a top guard portion carrying a connector unit 7, which projects towards the steering wheel. The flat cable 6 is connected to outside electrical circuits through the connector unit 7. When the number of outside circuits to be connected thereto is rather limited, the connector unit 7 may include only one array of pole cavities. However, when the number of outside circuits must be increased, the connector unit 7 may include two arrays of pole cavities, so as to form a multipolar configuration in the connector unit 7, as shown in FIG. 2.

Alternatively, the connector unit 7 may be divided into two subdivisions 7A and 7B located on different sites of the top guard portion, as shown in FIG. 3.

However, when the connector unit 7 is enlarged on a single site and the number of poles therein is increased, the number of electrical cables to be connected will be increased correspondingly. The end portions of the electrical cables will then become more entangled and difficult to handle. The structure of the connector unit 7 thus becomes more complex, and the number of steps for assembling the structure is increased.

Alternatively, as shown in FIG. 3, the connector unit 7 may be divided into two subdivisions 7A and 7B, which are placed at two symmetrically opposed positions on a diametrical center line of the mobile member 5.

In the above construction, the mobile member is mounted onto the fixed member which is immobilized at a fixed position. In such a construction, however, a plurality of connector units e.g. 7A and 7B cannot be welded successively simply by displacing the mobile member through a rotating action. For instance, a welding machine, equipped with an anvil 10 and a horn 11, must first be provided (shown in broken lines in FIG. 3). The anvil 10 and horn 11, once placed over the mobile member 5, are then reciprocated in a linear direction in the direction of the arrows in FIG. 3 while performing welding. Accordingly, when one of the subdivisions 7A and 7B is welded, the other, which is located diametrically opposite, must be placed in a position interfering with the anvil 10.

Accordingly, when the mobile member 5 is assembled with the fixed member 2, which is immobilized in turn, a plurality of subdivisions 7A and 7B can no longer be welded by an ultrasonic or resistance welder simply by effecting a rotating displacement of the mobile member 5.

Accordingly, the bus bars and electrical cables in the plurality of subdivisions 7A and 7B must be welded with the mobile member 5 not yet attached to the fixed member 2 and thus able to move up and down. Alternatively, the electrical cables may be connected to the connector units of the mobile member 5, before the latter is attached to the fixed member 2. However, in such a case, the assembling operation of the cable reel 1 will become very complicated.

SUMMARY OF THE INVENTION

In order to solve such problems, the present invention has been contemplated to provide a cable reel structure which includes a torus-shaped enclosure defined by a fixed member and a mobile member mounted thereon, the torus-shaped enclosure containing a flat cable or harness. The above mobile member includes a top guard portion, from which a plurality of connector units extend upwardly. The above flat cable or harness is then connected to bus bars. Subsequently, these bus bars are weld-bonded to the electrical cables in those connector units.

To this end, there is provided a cable reel structure configured to be mounted into a steering system for vehicles. The cable reel structure includes a fixed member, a mobile member having a top guard portion, and an enclosure having a diametrical center line and storing a flat cable. The flat cable contains several conductor elements respectively including a first end portion to be fixed to the fixed member and a second end portion to be fixed to the mobile member, such that the flat cable can be connected to outside circuits.

The second end portions of the conductor elements respectively include bus bars bonded thereto.

Further, the top guard portion of the mobile member includes at least first and second connector units adapted to receive the outside circuits, and each of the at least first and second connector units contains the bus bars extending there through.

The at least first and second connector units can then be placed in staggered positions with respect to the diametrical center line, such that, even after the mobile member has been mounted on the fixed member, welding of the bus bars to the outside circuits can be performed, successively in the at least first connector unit and the at least second connector unit, by rotating the mobile member after the welding has been performed in the at least first connector unit.

Preferably, the cable reel structure is defined by a fixed member and a mobile member so as to form a torus-shaped enclosure.

Preferably yet, the welding is performed by a welding machine including an anvil and a horn. The anvil and the horn form a working zone, within which they are moved closer to, or farther from, each other, while performing the welding in the at least first connector unit, and the staggered positions are defined such that the at least second connector unit is placed outside the working zone.

Suitably, the at least first and second connector units respectively include the same number of connector poles.

As mentioned above, a plurality of connector units are placed at staggered positions to one another. Accordingly, when the bus bars and outside circuits (electrical cables) in a first connector unit have been welded, the mobile member can be rotated around a fixed axis. The bus bars and outside circuits in a second connector unit are then welded without being impeded by the first connector unit. In this manner, welding operations can be performed even after the mobile member has been mounted onto the fixed member. Welding operations are thus carried out more efficiently, and are more amenable to automation.

Further, when the connector units are configured so as to each contain the same number of connector poles, welding can be effected using the same anvil welder body and horn welder body.

In another aspect of the present invention, a method is provided for assembling a cable reel structure for mounting in a steering system for automobiles. The method includes provision of a cable reel structure including a fixed member, a mobile member having a top guard portion and an enclosure having a diametrical center line and storing a flat cable. The flat cable contains several conductor elements respectively including a first end portion to be fixed to the fixed member and a second end portion to be fixed to the mobile member, such that the flat cable can be connected to outside circuits. The second end portions of the conductor elements respectively include bus bars bonded thereto.

The method may further include provision of at least first and second connector units on the top guard portion of the mobile member, which are adapted to receive the outside circuits. Each of the at least first and second connector units contains the bus bars extending therethrough. The at least first and second connector units are located at staggered positions with respect to the diametrical center line.

The method may further include welding of the bus bars to the outside circuits in the at least first connector unit, rotating the mobile member after the welding has been performed in the at least first connector unit and welding the bus bars to the outside circuits in the at least second connector unit.

In a further aspect of the present invention, the method utilizes a welding machine which includes an anvil and a horn which form a working zone within which they are moved closer to, or farther from, each other, during welding. The at least first connector unit is initially located within the working zone for welding of the bus bars to the outside circuits in the at least first connector unit. The at least second connector unit is initially located outside the working zone so as not to interfere with movement of the anvil and the horn during welding of the bus bars to the outside circuits in the at least first connector unit.

In a still further aspect of the present invention, rotation of the mobile member locates the at least second connector unit within the working zone for welding of the bus bars to the outside circuits in the at least second connector unit. Rotation of the mobile member also locates the at least first connector unit outside the working zone so as not to interfere with movement of the anvil and the horn during welding of the bus bars to the outside circuits in the at least second connector unit.

Further, the welding may include ultrasonic welding or resistance welding.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1:
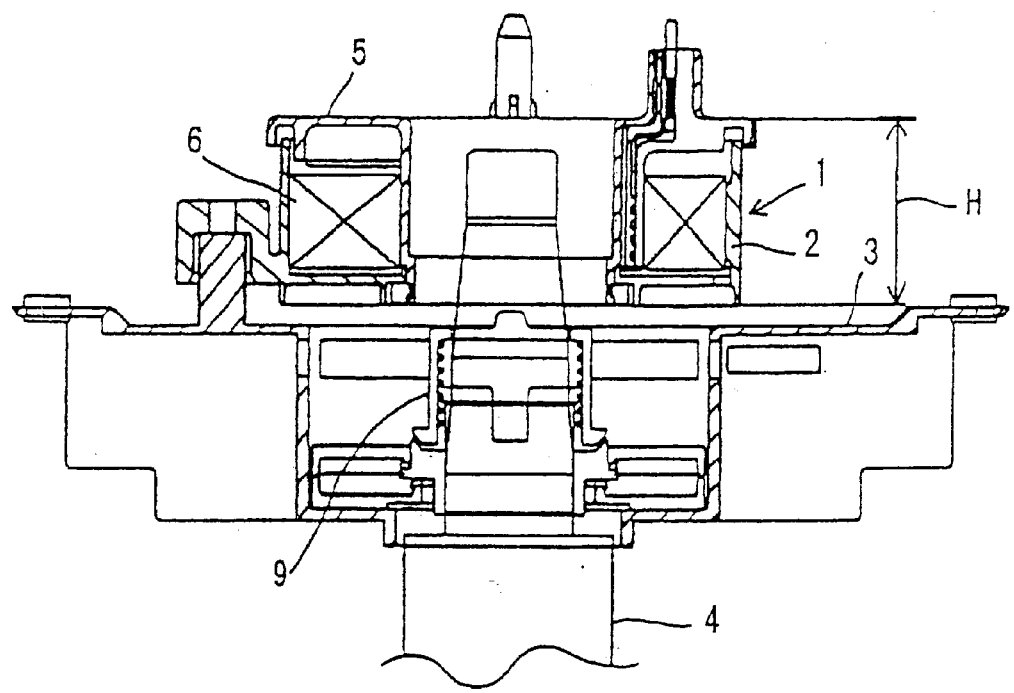
FIG. 1 is a cross-sectional side view of a conventional cable reel, illustrating its general construction.
Figure 2:
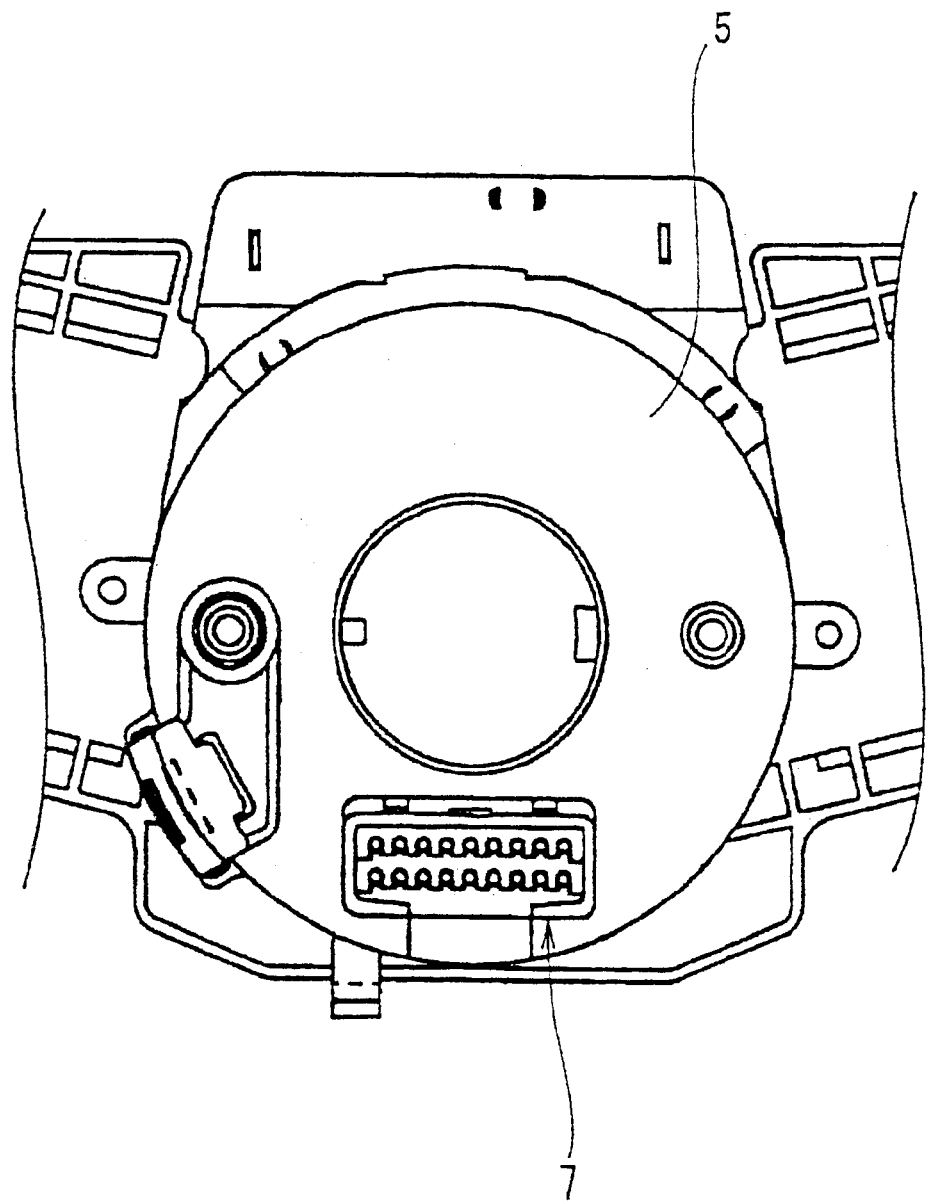
FIG. 2 is a top plan view of a prior art cable reel.
Figure 3:
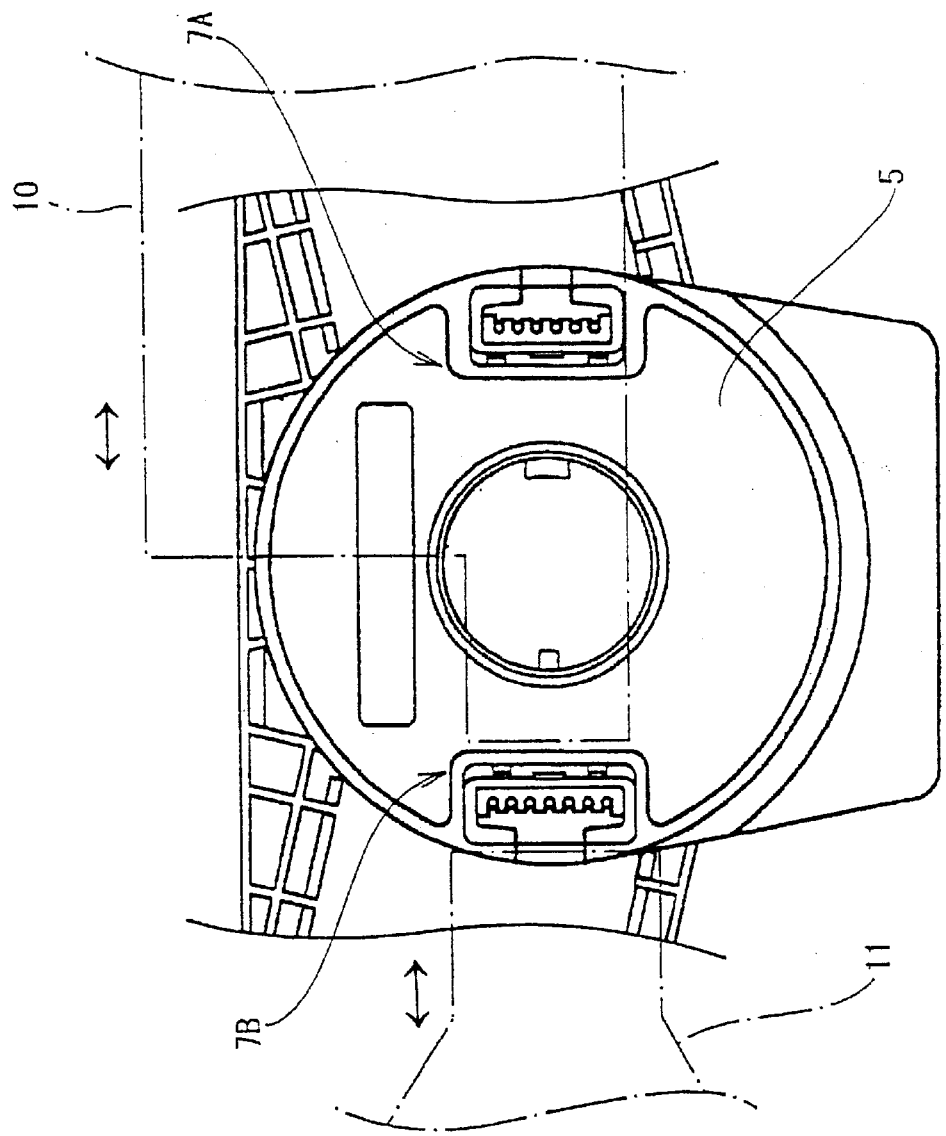
FIG. 3 is a top plan view of another prior art cable reel.
Figure 4:
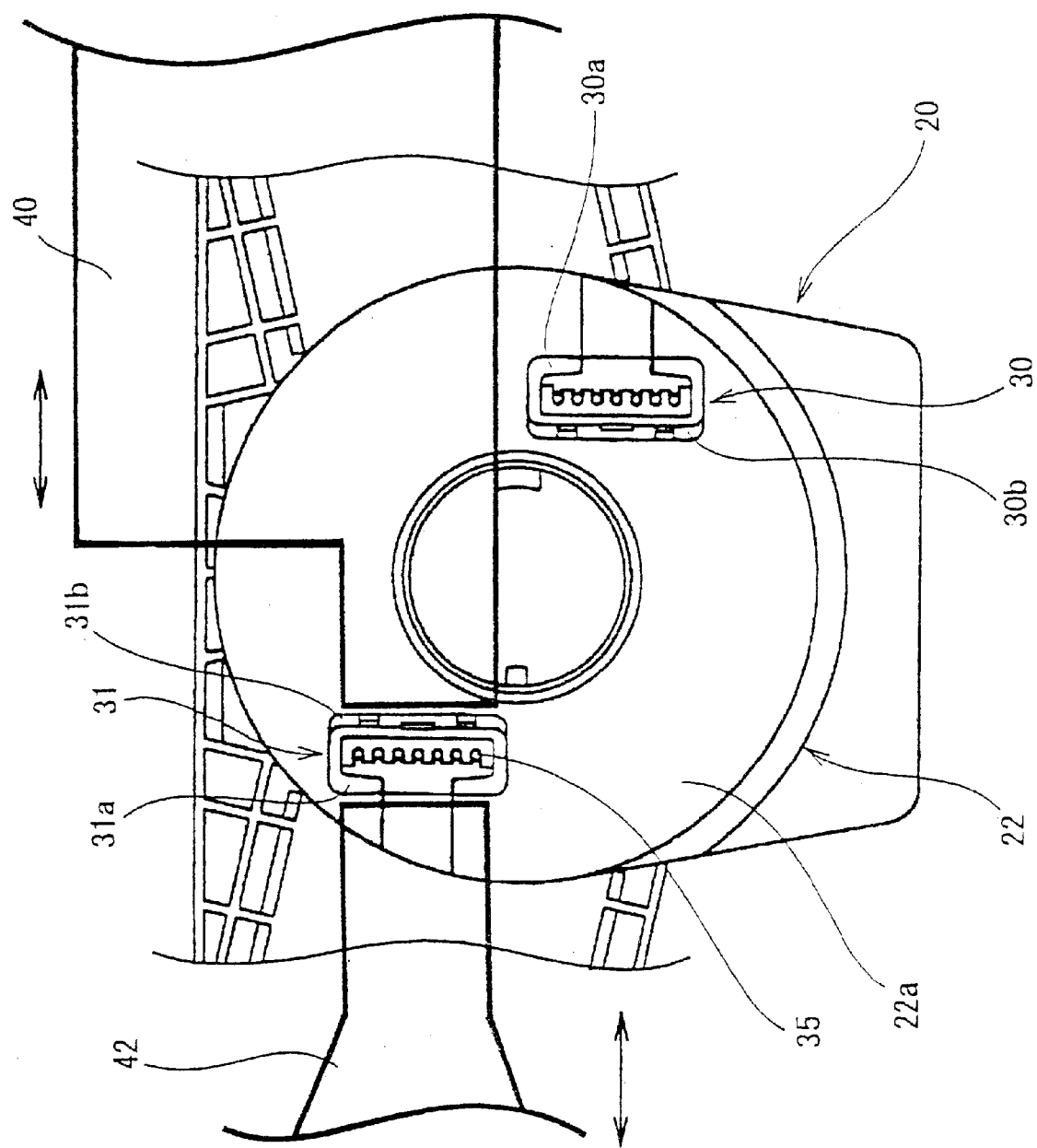
FIG. 4 is a top plan view of a cable reel structure according to the present invention.
Figure 5:
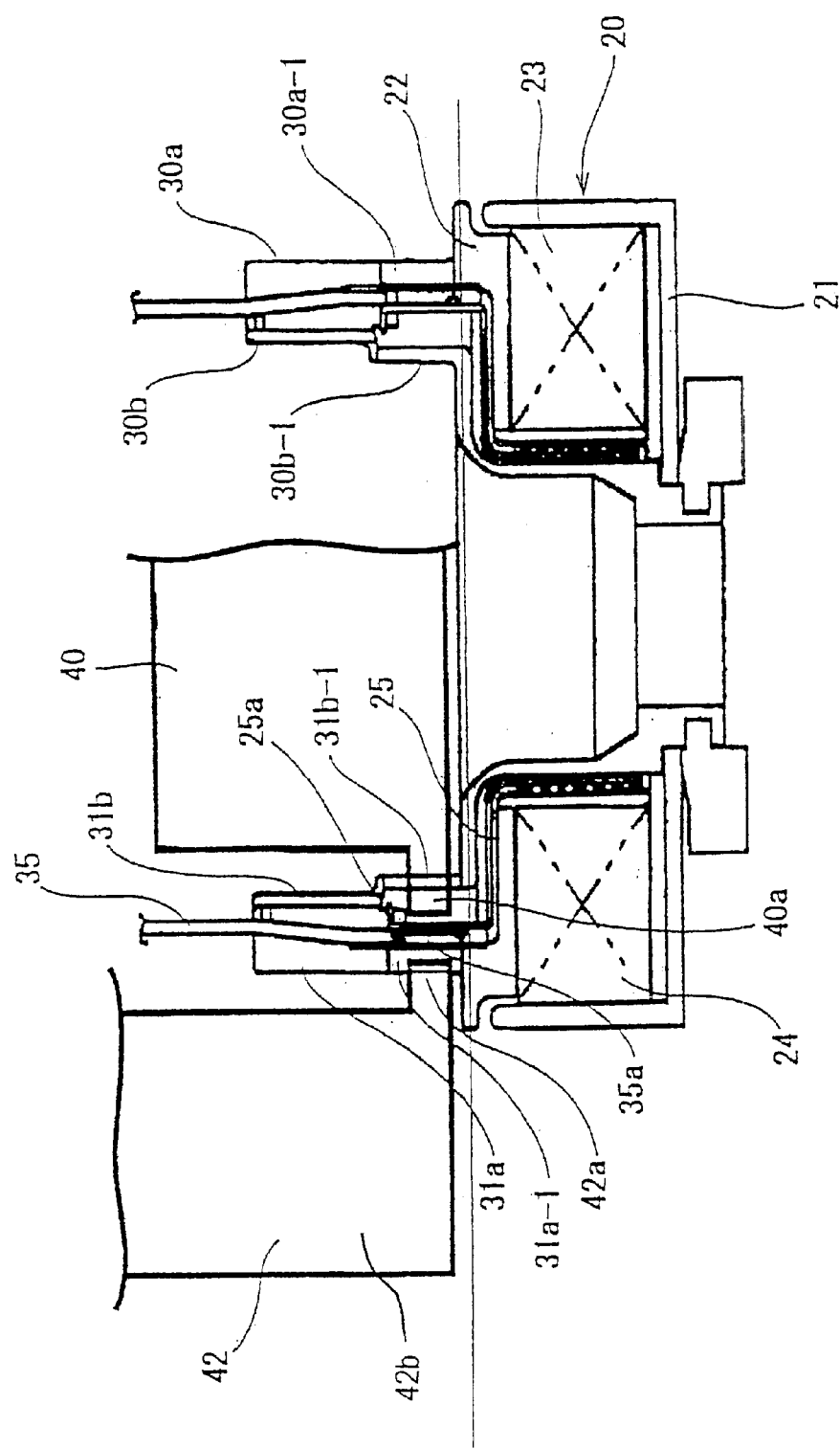
FIG. 5 is a cross-sectional side view of the cable reel structure of FIG. 4.

A cable reel 20 shown in FIGS. 4 and 5 is mounted into a steering system for a vehicle e.g. automobile, as in the case of the conventional construction shown in FIG. 1. A fixed member 21 including a cylindrical outer wall is fixed to a steering column (not shown in the figures) on an assembly line, while a mobile member 22 including a cylindrical inner wall is fixed to a steering wheel.

The mobile member 22 is mounted onto the fixed member 21 so as to form a torus-shaped enclosure 23, in which a flat cable 24 is stored in a spiraled condition.

The mobile member 22 includes a top guard wall 22a, which carries first and second connector units 30 and 31, formed unitarily and in one piece therewith and projecting therefrom. As shown in FIG. 5, each of the first and second connector units 30 and 31 has a substantially rectangular parallelepiped form, having, inter alia, first (30a and 31a) and second (30b and 31b) long sidewalls. Of course, the connector units may have any suitable configuration. The first long sidewalls (30a and 31a) are located diametrically in the outer side, relative to the second long sidewalls (30b and 31b), in the radial direction of the torus-shaped cable reel. Each of the first and second connector units 30 and 31 then contains terminals aligned in a suitable array. The base portion (cable reel side) of the first connector unit 30 includes bottom openings 30a-1 and 30b-1 which face each other in the corresponding first and second long sidewalls 30a and 30b. Likewise, the base portion (cable reel side) of the second connector unit 31 includes bottom openings 31a-1 and 31b-1 which face each other in the corresponding first and second long sidewalls 31a and 31b.

As mentioned above, each of the bus bars 25 includes a first end portion welded to a bared conductor element of the flat cable 24 and a second end portion 25a projecting in an array between the openings 30a-1 and 30b-1 (and, 31a-i and 31b-1 in the case of the second connector unit 31). The first and second connector units 30 and 31 respectively include a top opening, through which are inserted wire cores 35a exposed from the end portions of outside electrical cables 35. A wire core 35a of an electrical cable 35 is then superposed on the second end portion 25a of a corresponding bus bar 25. Subsequently, a welding tip 40a of the anvil 40 and a welding tip 42a of the horn 42 are inserted through the bottom openings 30a-1 and 30b-1 (and 31a-1 and 31b-1), and bond the wire cores 35a to the second end portions 25a of the bus bars 25. The number of the poles for both connector units 30 and 31 may be set to be the same.

The ultrasonic welding machine equipped with an anvil 40 and horn 42 is fixed at a predetermined position. The anvil 40 includes a welder body 40b, and an edge portion where a welding tip 40a of the anvil 40 is provided. Likewise, the horn 42 includes a welder body 42b, and an edge portion where a welding tip 42a of the horn 42 is provided. When the welding is to be carried out, a cable reel 20 is installed in a space below the anvil 40 and the horn 42. In this manner, the welder bodies 40b and 42b face each other over the mobile member 22 of the cable reel 20, as illustrated in FIG. 4.

Figure 6:
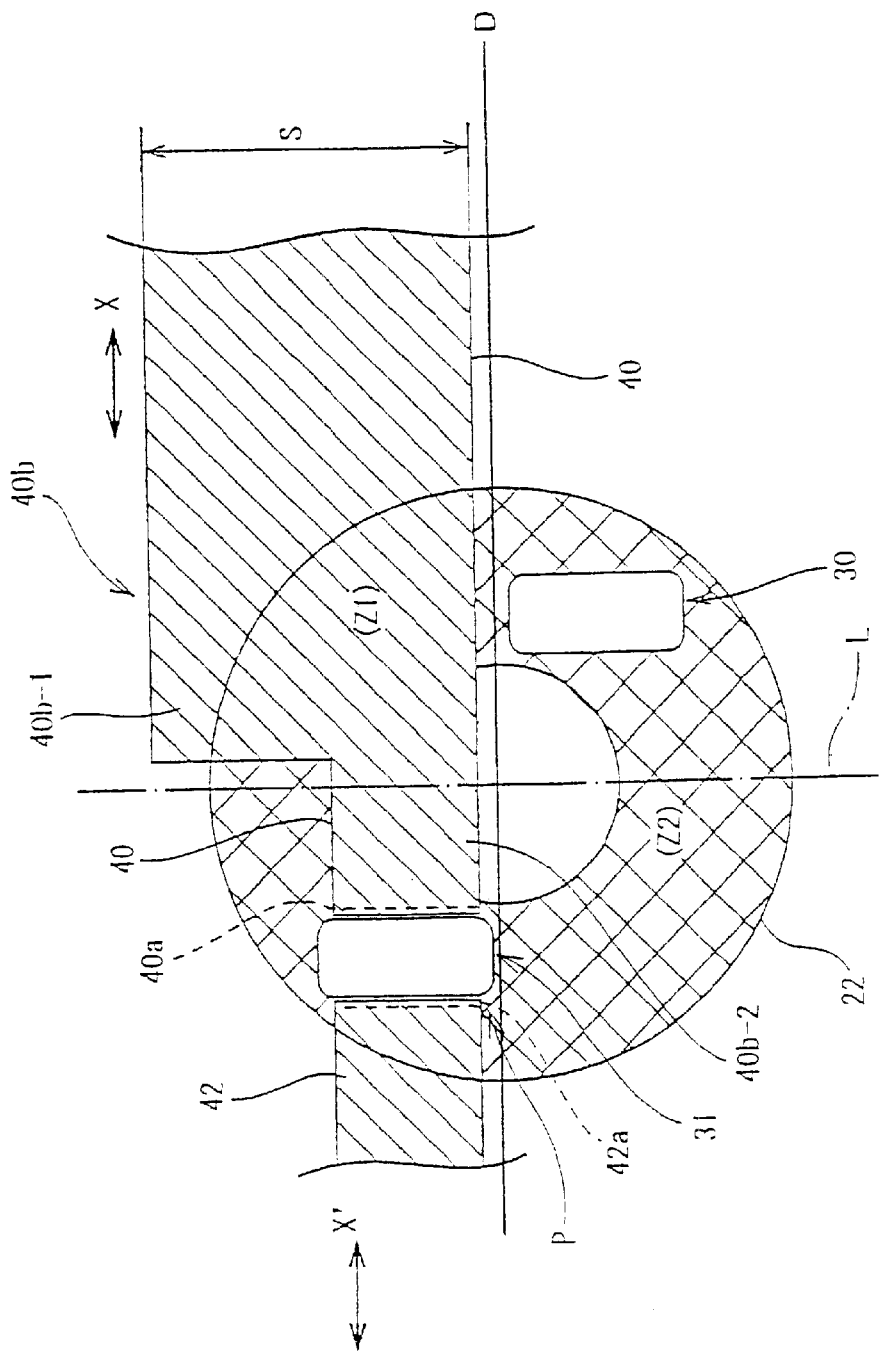
FIG. 6 is a schematic top plan view showing relative positions between connector units and a welding machine.

The welder body 40b of the anvil 40 includes a base portion 40b-1 having a width S corresponding to about one fourth of the contour length of the mobile member 22, and a projecting portion 40b-2 projecting from one end of the base portion 40b-1 and crossing the diametrical center line L of the mobile member 22 (note perpendicular diametrical center lines L and D in FIG. 6). The welder body 40b of the anvil 40 reciprocates in the linear direction shown by arrow X in FIG. 6. Conversely, the welder body 42b of the horn 42 is placed over the mobile member 22, but outside the contour thereof, and faces the welder body 40b of the anvil 40. However, its welding tip 42a extends from the outside into inside the contour of the mobile member 22, and reciprocates in the linear direction shown by arrow X' (FIG. 6). As shown in FIG. 6, the principal welding planes of the bus bars in the first and second connector units 30 and 31 are parallel to one another, and to diametrical center line L.

In the conventional construction shown in FIG. 1, the two connector units of the cable reel are placed at symmetrical positions to each other with respect to the center of the mobile member 22, and the latter is fixed in a predetermined position. In such a case, when one of the connector units is to be welded by the anvil 40 and the horn 42, the other connector unit is brought in the way of the welder body 40b of the anvil 40, thereby impeding welding operations.

To solve such problems, the first connector member 30 and the second connector member 31 according to the present invention are placed diametrically opposite to one another, in staggered or offset positions with respect to the diametrical center lines L and D of the mobile member 22 (note FIG. 6). Accordingly, when the first connector unit 30 is first welded, it is removed from the reciprocating-movement field of the anvil 40 and horn 42. This field is illustrated as zone Z1 shown by oblique lines in FIG. 6, and corresponds to a zone in FIG. 4 where the anvil 40 and the horn 42 are placed. The second connector unit 31 is provided outside the above zone, i.e. at zone Z2 shown cross-hatched in FIG. 6. The second connector unit 31 may be installed anywhere, so long as it is in zone Z2.

There may be provided a third or further connector unit(s) so long as it is or they are in zone Z2.

The connector units 30 and 31 of the cable reel 20 may be prepared and subjected to a welding operation according to the following steps.

The cable reel 20 is formed by mounting a fixed member 21 and a mobile member 22, so as to form a cable enclosure. The cable enclosure stores a flat cable 24. Then, the mobile member 22 is installed at a given position under the welder body 40b of the anvil 40 and welder body 42b of the horn 42.

A first connector unit 30 is first placed at a welding position P between the anvil welding tip 40a and the horn welding tip 42a, so that the bus bars 25 in the first connector unit 30 can be welded to the wire cores of the outside electrical cables 35.

After welding, the welder body 40b of the anvil 40 and the welder body 42b of the horn 42 are moved back. During the above operation, the connector units 30 and 31 do not interfere with the welder bodies 40b and 42b, and can be rotated at the above given position.

The already welded first connector unit 30 is moved from zone Z1 where the anvil 40 and the horn 42 are in operation, away into zone Z2. A second connector unit 31 is then placed at the welding position P, as shown in FIG. 4.

To do this, the mobile member 22 is rotated and placed at the position P shown in FIG. 6. The anvil welder body 40b and the horn welder body 42b are then mutually approached, and the welding is performed for the second connector unit 31. When the anvil welder body 40b is being advanced, the first connector unit 30 is placed in the zone Z2, away from the zone Z1. Accordingly, the anvil welder body 40b can be advanced up to the welding position P (FIG. 6), without interfering with the first connector unit 30.

The above steps can be summarized as follows. The mobile member 22 is mounted onto the fixed member 21, and the assembly of the cable reel 20 is completed. The cable reel 20 is then placed under the welding machine. The first connector unit 30 is first welded. Then, the mobile member 22 is rotated at a fixed position, and the second connector unit 31 is welded. The number of poles in each of the connector units e.g. 30 and 31 is set to be the same, so that, by rotating the mobile member 22, welding in a plurality of connector units e.g. 30 and 31 can be performed with a single anvil welder body 40b and horn welder body 42b.

In the above embodiments, an ultrasonic welding machine was used. Alternatively, a resistance welding machine can be used in the same working configuration involving an anvil and a horn. In such a case, a plurality of connector units are mounted on the mobile member into the same configuration as in the above embodiments. Once a cable reel is assembled, welding is performed in the connector units.

According to the invention, the mobile member is provided with a plurality of connector units arranged in staggered, but not symmetrical, positions to one another, with respect to the diametrical center line of the mobile member. After the mobile member equipped with a plurality of connector units is mounted onto the fixed member, and the cable reel is thus assembled, a resistance or ultrasonic welding is performed in the connector units.

Accordingly, when external electrical cables are to be connected to the connector units, the size arrangement of these electrical cables can be made more easily. Further, as welding operations can be performed efficiently in a plurality of connector units, the manufacture of a cable reel becomes easier, and can be automated more easily.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-144430, filed on May 17, 2000, the disclosure of which is herein expressly incorporated by reference in its entirety.

What is claimed:

1. A cable reel structure configured to be mounted into a steering system for automobiles, said cable reel structure comprising:

a fixed member;

a mobile member having a top guard portion; and an enclosure having a first diametrical center line and a second diametrical center line perpendicular thereto, and storing a flat cable, the flat cable containing several conductor elements respectively including a first end portion to be fixed to said fixed member and a second end portion to be fixed to said mobile member, such that the flat cable can be connected to outside circuits, and the second end portions of the conductor elements respectively including bus bars bonded thereto;

said top guard portion of said mobile member comprising at least first and second connector units adapted to receive the outside circuits, each of said at least first and second connector units containing the bus bars extending therethrough; and said at least first and second connector units being located diametrically opposite to one another at positions offset with respect to said first and second diametrical center lines, such that principal welding planes of the bus bars contained within said first and second connector units are substantially parallel to each other and to said first diametrical center line, wherein, even after said mobile member has been mounted on said fixed member, welding of the bus bars to the outside circuits can be performed, successively in said at least first connector unit and said at least second connector unit, by rotating said mobile member after the welding has been performed in said at least first connector unit.

2. The cable reel structure according to claim 1, wherein said fixed member and said mobile member form a torus-shaped enclosure.

3. The cable reel structure according to claim 1, wherein the welding is performed by a welding machine comprising an anvil and a horn, said anvil and said horn forming a working zone, within which they are moved closer to, or farther from, each other, while performing the welding in said at least first connector unit, and wherein said offset positions are defined such that said at least second connector unit is initially located outside said working zone.

4. The cable reel structure according to claim 2, wherein the welding is performed by a welding machine comprising an anvil and a horn, said anvil and said horn forming a working zone, within which they are moved closer to, or farther from, each other, while performing the welding in said at least first connector unit, and wherein said offset positions are defined such that said at least second connector unit is initially located outside said working zone.

5. The cable reel structure according to claim 1, wherein said at least first and second connector units respectively comprise a same number of connector poles.

6. The cable reel structure according to claim 2, wherein said at least first and second connector units respectively comprise a same number of connector poles.

7. The cable reel structure according to claim 3, wherein said at least first and second connector units respectively comprise a same number of connector poles.

8. The cable reel structure according to claim 4, wherein said at least first and second connector units respectively comprise a same number of connector poles.

* * * * *